May 11, 1926.

H. H. KROHN

HARROW CART

Filed June 9, 1925

1,583,888

Inventor
H. H. Krohn
By
D. Swift
Attorney

Patented May 11, 1926.

1,583,888

UNITED STATES PATENT OFFICE.

HENNING H. KROHN, OF CLEARWATER, NEBRASKA.

HARROW CART.

Application filed June 9, 1925. Serial No. 35,937.

The invention relates to harrow carts and has for its object to provide a cart, to the rear ends of which harrows may be attached, and on which cart the operator may sit for controlling the draft animals hitched to the cart and at the same time observing the operation of the harrows and easily and accurately controlling the harrows.

A further object is to provide the cart with a rearwardly extending substantially horizontal bar, under which a transversely disposed harrow carrying bar is disposed, and which harrow carrying bar, substantially centrally thereof, is provided with upwardly extending spaced apertured arms between which the rearwardly extending bar is disposed and bolts extending through the upwardly extending arms above and below the rearwardly extending bars for maintaining the harrow carrying bar at the proper elevation.

A further object is to provide braces connected to the harrow carrying bar at opposite ends thereof, which braces converge inwardly and forwardly and are anchored detachably to the underside of the cart.

A further object is to provide supporting wheels for the cart, which are carried by pivoted caster brackets, and which supporting wheels allow the cart and harrow to be turned around in a relatively small space.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
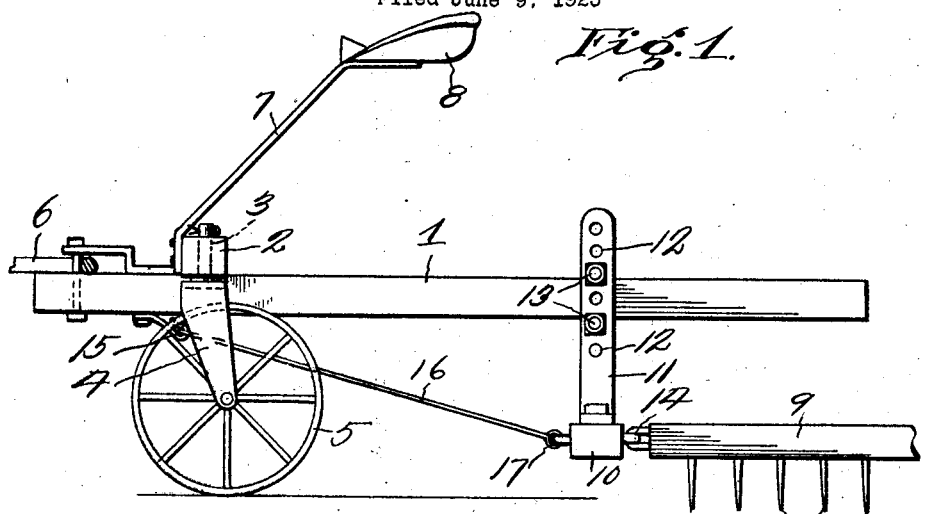
Figure 1 is a side elevation of the harrow cart showing a harrow attached thereto.
Figure 2:
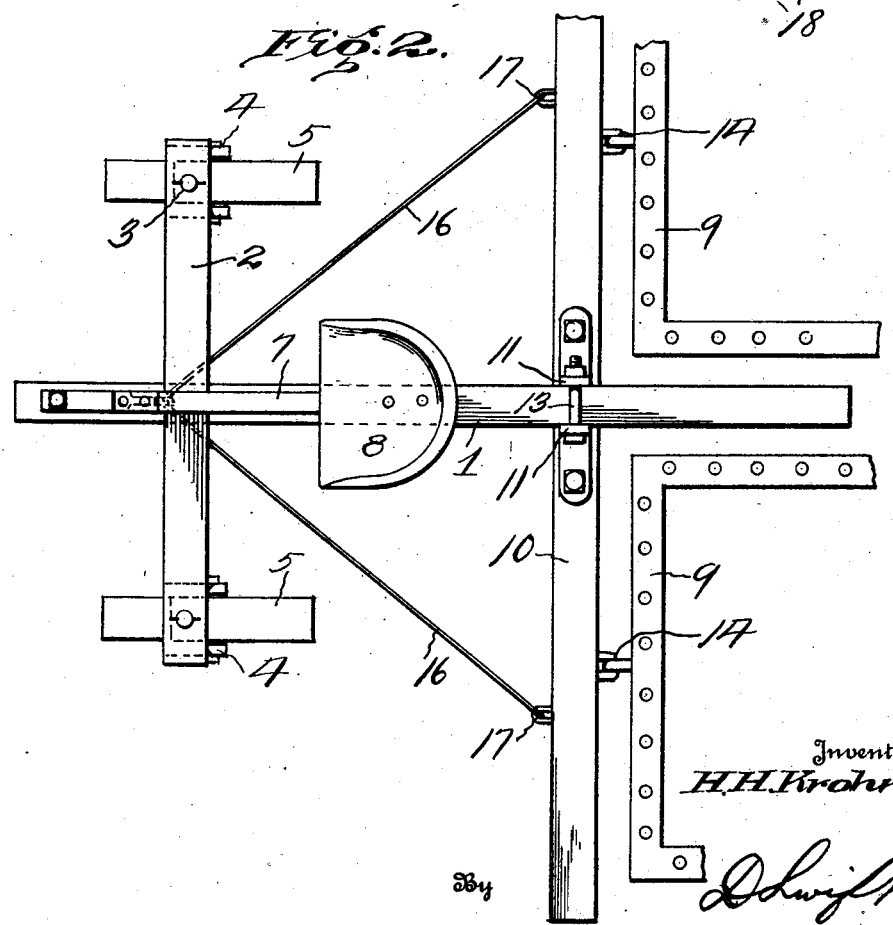
Figure 2 is a top plan view of the cart.

Referring to the drawing, the numeral 1 designates an elongated horizontally disposed beam, which beam adjacent its forward end is provided with a transversely disposed bar 2, in the ends of which are pivotally connected at 3 caster brackets 4, in which are rotatably mounted ground engaging wheels 5. It will be noted by providing the caster brackets 4 the device may be turned in a relatively small space which is particularly adapted in connection with devices for dragging harrows. Beam 1 adjacent its forward end has connected thereto a draft link 6, to which draft animals may be hitched in any suitable manner to a single or double tree if desired. Extending upwardly and rearwardly from the bar 2 is a seat supporting arm 7 on the upper end of which is disposed a seat 8 on which the operator may sit for controlling the draft animals, and relatively close to the draft animals, which is particularly desirable in operating harrows, and at the same time the operator is in a position where the maximum control may be had over the draft animals, and at the same time the harrow 9 may be easily observed by the operator, and the operator will be out of the dust and dirt during the operation of the harrow. Extending transversely below the beam 1 and spaced downwardly therefrom is a harrow drag bar 10, which harrow drag bar substantially centrally thereof is provided with upwardly extending spaced arms 11, which receive therebetween the beam 1. Arms 11 are provided with a plurality of apertures 12 through which bolts 13 extend above and below the beam 1, therefore it will be seen that the bar 10 will be held in spaced relation to the beam 1 at all times, and the harrows 9 which are connected at 14 to the harrow drag bar 10 will be held to the ground. Detachably connected at 15 to the under side of the beam 1 are rearwardly and downwardly diverging brace rods 16, which rods are connected at 17 to the harrow drag bar 10 and brace and hold said bar as the machine advances. By providing the detachable connection 15 it will be seen that after a harrowing operation the harrows may be easily and quickly detached from the harrow cart at 15, and by removing the upper bolt 13, or instead of moving the bolt 13, advancing the cart until the rear end of the beam 1 is moved from between the upwardly extending arms 11.

From the above it will be seen that a harrow cart is provided which is located forwardly of the harrow where the operator will be out of the dust and dirt of the harrows and in a position where draft animals may be more advantageously controlled and the operation of the harrows observed at all times. It will also be seen that the harrow cart may be easily and quickly detached from the harrows, and when attached the beam 1 will insure the penetration of the harrow teeth 18 into the ground, and the harrows can be acurately controlled and guided.

The invention having been set forth what is claimed as new and useful is:—

1. A harrow cart comprising a longitudinally disposed beam, a transversely disposed bar adjacent one end of the beam, supporting wheels carried by the ends of the transversely disposed bar, means whereby draft animals may be attached to one end of the beam, a transversely disposed harrow drag bar beneath the beam, upwardly extending apertured arms carried by the drag bar and between which the beam extends, transversely disposed bolts extending through apertures of the arms above and below the beam, a brace detachably connected to the underside of the beam, said brace comprising downwardly extending diverging arms, the ends of said diverging arms being connected to the harrow drag bar.

2. A harrow cart comprising a longitudinally disposed beam, means for attaching draft animals to the forward end of the beam, a transversely disposed bar carried by the beam adjacent its forward end, supporting caster wheels pivotally connected to the ends of the bar, a seat supported adjacent the forward end of the beam, a transversely disposed harrow drag bar beneath the beam adjacent its rear end, spaced upwardly extending apertured arms carried by the drag bar and engaging opposite sides of the beam, bolts extending through the upwardly extending arms above and below the beam and brace rods connected to the drag bar and detachably connected to the under side of the beam adjacent its forward end.

3. A harrow cart comprising a longitudinally disposed beam, means whereby draft means may be attached to the forward end of the beam, spaced supporting wheels carried by the forward end of the beam, a harrow drag bar beneath the beam, means whereby said harrow drag bar may be vertically adjusted to various positions on the beam and brace rods connected to the drag bar and extending upwardly and forwardly and detachably connected to the beam adjacent its forward end.

In testimony whereof I have signed my name to this specification.

HENNING H. KROHN.